United States Patent
Chang

(10) Patent No.: US 11,816,060 B2
(45) Date of Patent: Nov. 14, 2023

(54) UART INTERFACE CIRCUIT AND UART DATA CAPTURING METHOD

(71) Applicant: Nuvoton Technology Corporation, Hsinchu (TW)

(72) Inventor: Chih-Chiang Chang, Kaohsiung (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 0 days.

(21) Appl. No.: 17/465,379

(22) Filed: Sep. 2, 2021

(65) Prior Publication Data
US 2022/0318182 A1  Oct. 6, 2022

(30) Foreign Application Priority Data

Mar. 31, 2021  (TW) .................................. 110111754

(51) Int. Cl.
| | | |
|---|---|---|
| G06F 13/42 | (2006.01) | |
| G06F 5/16  | (2006.01) | |
| G06F 13/38 | (2006.01) | |

(52) U.S. Cl.
CPC ............ *G06F 13/4291* (2013.01); *G06F 5/16* (2013.01); *G06F 13/385* (2013.01); *G06F 13/4286* (2013.01)

(58) Field of Classification Search
CPC ...... G06F 13/4291; G06F 5/16; G06F 13/385; G06F 13/4286
See application file for complete search history.

(56) References Cited

U.S. PATENT DOCUMENTS

| | | | |
|---|---|---|---|
| 6,032,213 A      | 2/2000 | Gulick | |
| 2011/0116557 A1* | 5/2011 | Agrawal | H04L 7/0331 |
| | | | 375/259 |
| 2018/0276516 A1* | 9/2018 | Ahn | G06K 19/0701 |

FOREIGN PATENT DOCUMENTS

| | | |
|---|---|---|
| CN | 107239422 A | 10/2017 |
| TW | I249305 B | 2/2006 |

* cited by examiner

*Primary Examiner* — Henry Tsai
*Assistant Examiner* — Aurangzeb Hassan
(74) *Attorney, Agent, or Firm* — MUNCY, GEISSLER, OLDS & LOWE, P.C.

(57) ABSTRACT

An UART interface circuit is provided in the invention. The UART interface circuit is configured in an electronic device. The UART interface circuit includes a baud-rate generating circuit, a control circuit, and a receiving circuit. The baud-rate generating circuit is configured to generate a baud rate and a start-bit cycle. The control circuit obtains the wakeup stable time from the wakeup time circuit of the electronic device and obtains the start-bit cycle from the baud-rate generating circuit. The receiving circuit is configured to capture data from the start bit or the first data bit of UART data. When the electronic device is woken up by the UART data, the control circuit compares the start-bit cycle with the wakeup stable time to direct the receiving circuit to start capturing data from the start bit or the first data bit of the UART data.

10 Claims, 3 Drawing Sheets

UART INTERFACE CIRCUIT AND UART DATA CAPTURING METHOD

CROSS REFERENCE TO RELATED APPLICATIONS

This Application claims priority of TW Patent Application No. 110111754 filed on Mar. 31, 2021, the entirety of which is incorporated by reference herein.

BACKGROUND OF THE INVENTION

Field of the Invention

The invention generally relates to Universal Asynchronous Receiver/Transmitter (UART) technology, and more particularly, to an UART technology in response to an electronic device is woken up by the UTRA data.

Description of the Related Art

The Universal Asynchronous Receiver/Transmitter (UART) interface is a common communication interface applied to the electronic device. The UART may comprise many kinds of standards. e.g. RS232. RS484, and so on. Traditionally, when the electronic device is woken up by the UART data, the electronic device needs to wait for a period of time called the "wakeup stable time" before the system is stable. When the system becomes stable, the electronic device will start to capture the UART data. However, when the length of the wakeup stable time is longer than a start-bit cycle corresponding the start bit in the UART data, an error of the reception of the UART will occur. In order to avoid this error, the baud rate of the UART will limited to the length of the wakeup stable time.

BRIEF SUMMARY OF THE INVENTION

A Universal Asynchronous Receiver/Transmitter (UART) interface circuit and UART data capturing method are provided to overcome the problems mentioned above.

An embodiment of the invention provides a Universal Asynchronous Receiver/Transmitter (UART) interface configured in an electronic device. The UART interface circuit comprises a baud-rate generating circuit, a control circuit and a receiving circuit. The baud-rate generating circuit is configured to generate a baud rate and a start-bit cycle. The control circuit is coupled to the baud-rate generating circuit. The control circuit obtains the wakeup stable time from the wakeup time circuit of the electronic device and obtains the start-bit cycle from the baud-rate generating circuit. The receiving circuit is coupled to the control circuit and configured to capture data from the start bit or the first data bit of UART data. When the electronic device is woken up by the UART data, the control circuit compares the start-bit cycle with the wakeup stable time to direct the receiving circuit to start capturing data from the start bit or the first data bit of the UART data.

According to an embodiment of the invention, when the start-bit cycle is longer than the wakeup stable time, the control circuit directs the receiving circuit to start capturing the UART data from the start bit after the wakeup stable time terminates.

According to an embodiment of the invention, when the start-bit cycle is not longer than the wakeup stable time, the control circuit directs the receiving circuit to start capturing the UART data from the first data bit after the wakeup stable time terminate. The control circuit determines the level of the first data bit according to the data in the $((2*M-N)/2)$-th system clock cycle of the first data bit, the data in the $((2*M-N)/2-1)$-th system clock cycle of the first data bit, and the data in the $((2*M-N)/2+1)$-th system clock cycle of the first data bit, wherein M is the start-bit cycle and N is the wakeup stable time.

According to an embodiment of the invention, the control circuit determines whether the electronic device is awakened by the UART data based on a set value corresponding to a wakeup state.

An embodiment of the invention provides a Universal Asynchronous Receiver/Transmitter (UART) data capturing method. The UART capturing method is applied to an UART interface circuit which is configured in an electronic device. The UART capturing method comprises the following steps: the control circuit of the UART interface circuit obtains the wakeup stable time from the wakeup time circuit of the electronic device and obtains the start-bit cycle from a baud-rate generating circuit of the UART interface circuit. When the electronic device is woken up by the UART data, the control circuit compares the start-bit cycle with the wakeup stable time to direct the receiving circuit of the UART interface circuit to start capturing data from the start bit or the first data bit of the UART data.

Other aspects and features of the invention will become apparent to those with ordinary skill in the art upon review of the following descriptions of specific embodiments of an UART interface circuit and UART data capturing method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
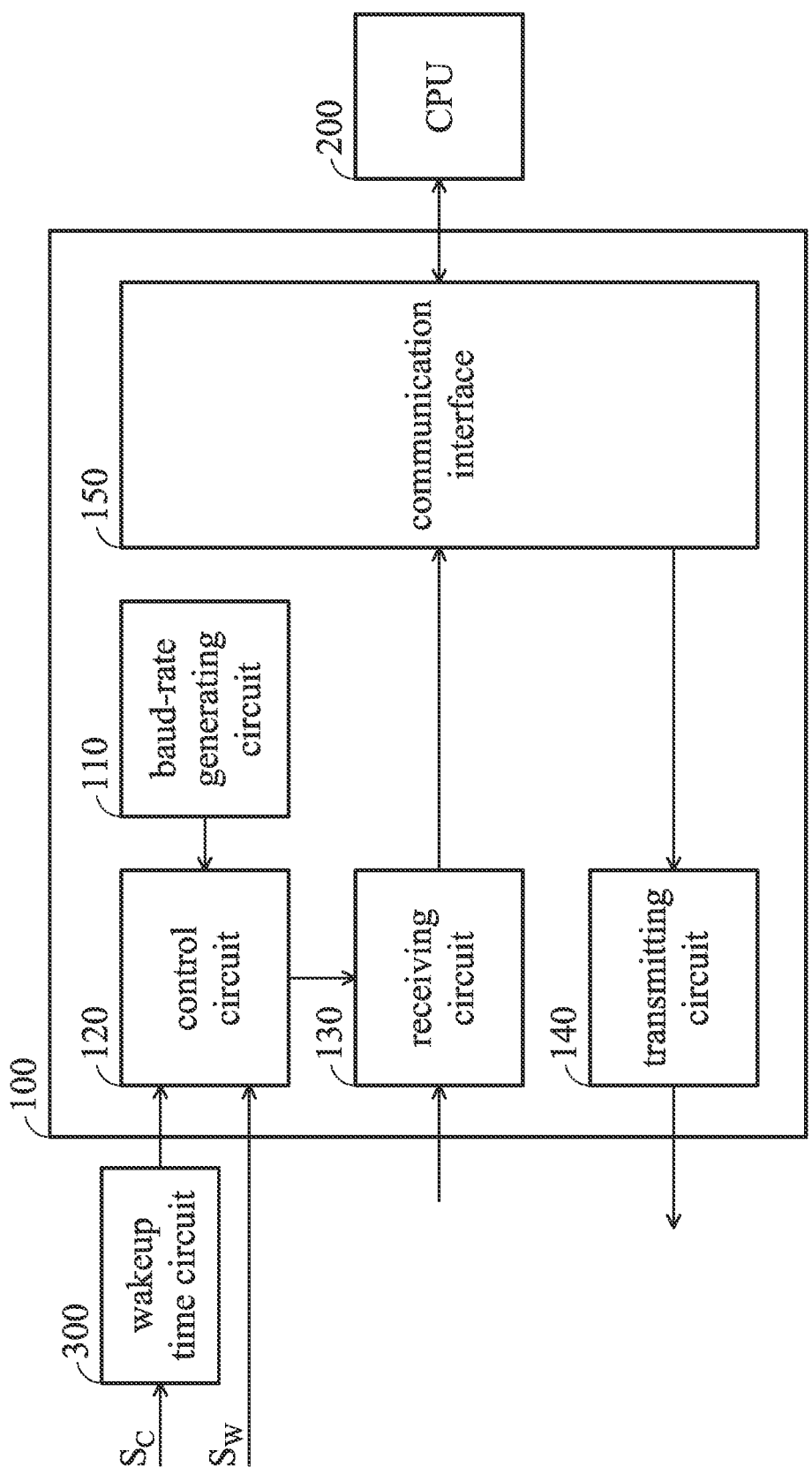
FIG. 1 is a block diagram of a Universal Asynchronous Receiver Transmitter (UART) interface circuit 100 according to an embodiment of the invention.

FIG. 1 is a block diagram of a Universal Asynchronous Receiver Transmitter (UART) interface circuit 100 according to an embodiment of the invention. As shown in FIG. 1, the UART interface circuit 100 may comprise at least a baud-rate generating circuit 110, a control circuit 120, a receiving circuit 130, a transmitting circuit 140 and a communication interface 150. It should be noted that FIG. 1 presents a simplified block diagram in which only the elements relevant to the invention are shown. However, the invention should not be limited to what is shown in FIG. 1.

According to the embodiments of the invention, the UART interface circuit 100 is configured in an electronic device for transmitting and receiving the UART data.

According to the embodiments of the invention, the baud-rate generating circuit 110 is configured to generate a baud rate and a start bit cycle M. The baud rate is used to indicate the rate of the UART data transmission. The start bit cycle M means that the time of transmitting the start bit is M system clock cycle (or period).

According to an embodiment of the invention, the receiving circuit 130 is configured to receive the UART data and transmit the UART data to the central processing unit (CPU) 200 of the electrical device through the communication interface 150. The transmitting circuit 140 is configured to receive the UART data from the communication interface 150 and transmit the UART to other peripheral elements of the electronic device to other electronic devices.

According to the embodiments of the invention, the communication interface 150 is configured to communicate with the CPU 200 of the electronic device.

According to an embodiment of the invention, the control circuit 120 may obtain the wakeup stable time N from the wakeup time circuit 300 of the electronic device, and obtain the start-bit cycle M from the baud-rate generating circuit 110. The wakeup time circuit 300 may calculate the wakeup stable time N based on the system clock $S_c$. When the electronic device is woken up by the UART data, the electronic device may wait the wakeup stable time N to make the system be stable. That is to say, if the electronic device is woken up by the UART data, the UART interface circuit 100 may not start to capture the UART data until the wakeup stable time N is terminated.

Figure 2A:
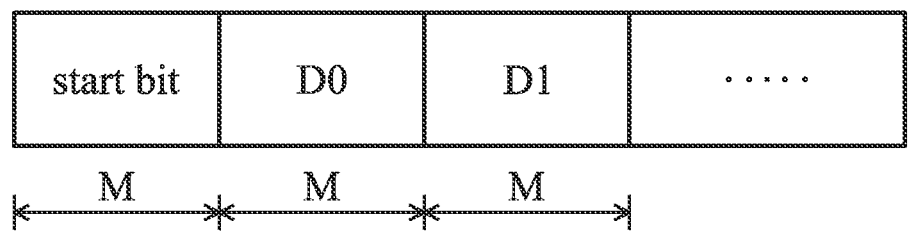
FIG. 2A is a schematic diagram illustrating of capturing UART data in a normal mode according to an embodiment of the invention.

According to an embodiment of the invention, control circuit 120 may know whether the system of the electronic device is woken up by the UART data based on a set value $S_w$ corresponding to a wakeup state. In the embodiment, the set value $S_w$ corresponding to the wakeup state may be a set value stored in a register (not shown in figures) of the electronic device. The control circuit 120 may obtain a flag value corresponding to the wakeup state from the register, and then determine that the flag value (i.e. the set value $S_w$) is high level or low level to know whether the system of the electronic device is woken up by the UART data. For example, when the set value $S_w$ is at a high level (e.g. 1), the control circuit 120 may know the system of the electronic device is woken up because of the operation for the UART data reception; and when the set value $S_w$ is at a low level (e.g. 0), the control circuit 120 may know the system of the electronic device is not woken up because of the operation for UART data reception. According to an embodiment of the invention, if the system of the electronic device is not woken up by the UART data (e.g. the system of the electronic device may be woken up through the General-purpose input/output (GPIO) of the electronic device, but the invention should not be limited thereto), the control circuit 120 may tell the receiving circuit 130 to receive the UART data in a normal mode. As shown in FIG. 2A, in the normal mode, when the start bit of the UART data is detected, the control circuit 120 may tell the receiving circuit 130 start capturing the UART data D0 after the start-bit cycle M is terminated. If the period of the UART data D0 also comprises M system clock cycle (or period), the control circuit 120 may determine the level of the UART data D0 according to the data in the M/2-th system clock cycle of the UART data D0, the data in the (M/2+1)-th system clock cycle of the UART data D0, and the data in the (M/2−1)-th system clock cycle of the UART data D0.

Figure 2B:
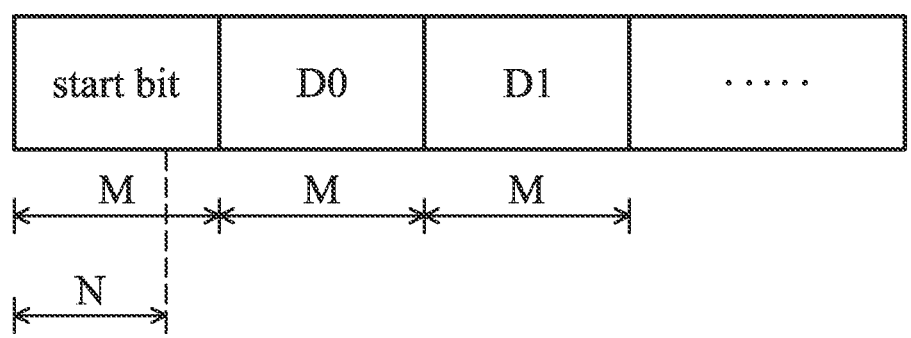
FIG. 2B is a schematic diagram illustrating of capturing UART data in a wakeup mode according to an embodiment of the invention.

According to an embodiment of the invention, if the system of the electronic device is woken up by the UART data (i.e. UART data wakeup mode), the control circuit 120 may compare the start-bit cycle M with the wakeup stable time N to direct the receiving circuit 130 start performing the operation of capturing data from the start bit or first data bit (i.e. the UART data D0) of the UART data. According to an embodiment of the invention, when the length of the start-bit cycle M is longer than the wakeup stable time N, the control circuit 120 may tell the receiving circuit 130 to start capturing data from the start bit of the UART data. That is to say, in the embodiment, when the wakeup stable time N is terminated, the control circuit 120 can confirm that the start bit exists. Therefore, control circuit 120 may tell the receiving circuit 130 to start performing the operation of capturing the UART data D0 after the wakeup stable time N is terminated. As shown in FIG. 2B, if the period of the UART data D0 also comprises M system clock cycle (or period), the control circuit 120 may determine the level of the UART data D0 according to the data in the M/2-th system clock cycle of the UART data D0, the data in the (M/2+1)-th system clock cycle of the UART data D0, and the data in the (M/2−1)-th system clock cycle of the UART data D0.

Figure 2C:
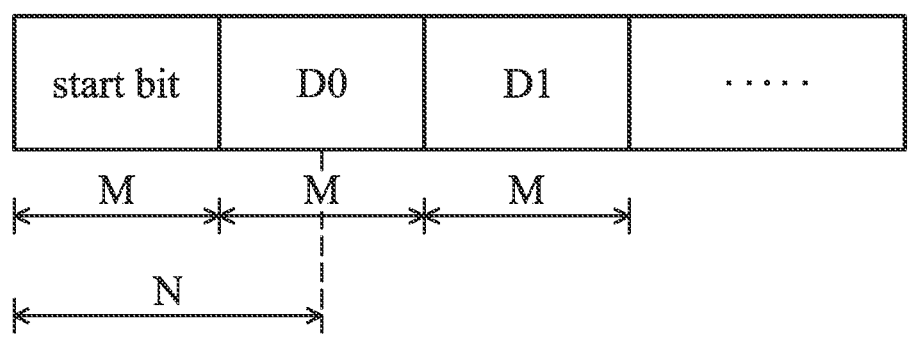
FIG. 2C is a schematic diagram illustrating of capturing UART data in a wakeup mode according to another embodiment of the invention.

According to another embodiment, when the length of the start-bit cycle M is not longer than the wakeup stable time N, the control circuit 120 may tell the receiving circuit 130 to start performing the operation of capturing the UART data D0 from the first data bit (i.e. the UART data D0) of the UART data. That is to say, in the embodiment of the invention, the control circuit 120 may miss the time of confirming whether the start bit exists. Therefore, the control circuit 120 may ignore the start bit, and tell the receiving circuit 130 to start performing the operation of capturing the UART data D0 from the first data bit (i.e. the UART data D0) of the UART data after the wakeup stable time N is terminated. As shown in FIG. 2C, if the period of the UART data D0 also comprises M system clock cycle (or period), the control circuit 120 may determine the level of the UART data D0 according to the data in the ((2*M−N)/2)-th system clock cycle of the UART data D0, the data in the ((2*M−N)/2−1)-th system clock cycle of the UART data D0, and the data in the ((2*M−N)/2+1)-th system clock cycle of the UART data D0. When the control circuit 120 determines the level of the UART data D1 of the UART data, the control circuit 120 may return back to the normal mode to determine the level of the UART data D1. That is to say, if the period of the UART data D1 also comprises M system clock cycle (or period), the control circuit 120 may determine the level of the UART data D1 according to the data in the M/2-th system clock cycle of the UART data D1, the data in the (M/2+1)-th system clock cycle of the UART data D1, and the data in the (M/2−1)-th system clock cycle of the UART data D1.

Figure 3:
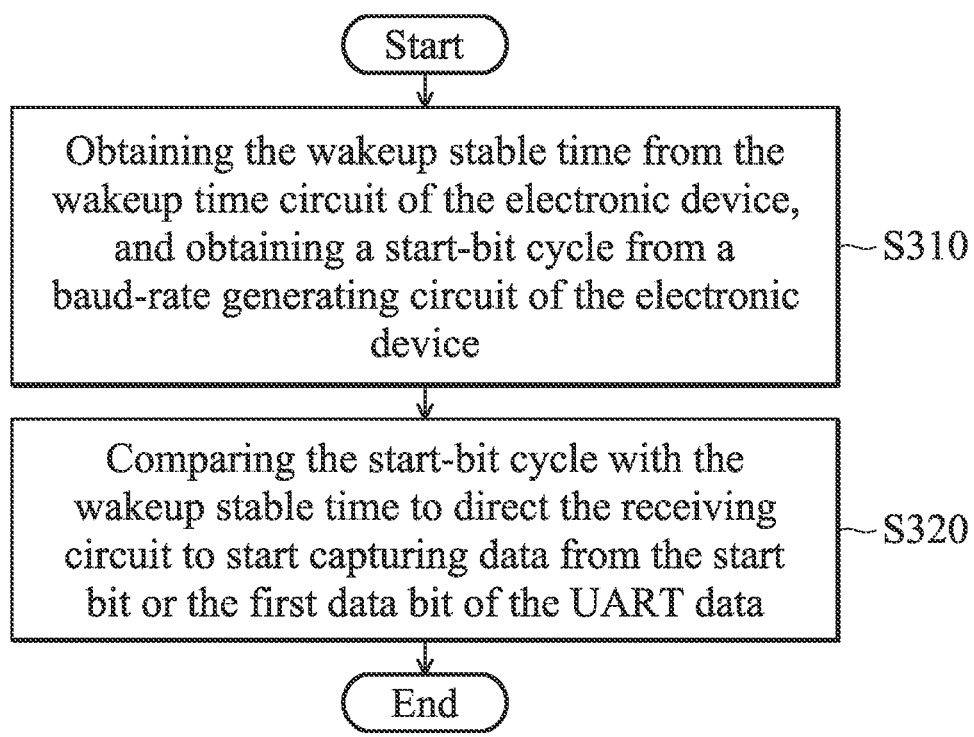
FIG. 3 is a flow chart illustrating an UART data capturing method according to an embodiment of the invention.

FIG. 3 is a flow chart illustrating an UART data capturing method according to an embodiment of the invention. The UART data capturing method can be applied to the UART interface circuit which is configured in an electronic device. As shown in FIG. 3, in step S310, a control circuit of the UART interface circuit obtains the wakeup stable time from the wakeup time circuit of the electronic device, and obtain a start-bit cycle from a baud-rate generating circuit of the electronic device.

In step 320, the control circuit compares the start-bit cycle with the wakeup stable time to direct the receiving circuit to start capturing data from the start bit or the first data bit of the UART data.

According to an embodiment of the invention, step S320 may further comprise: when the start-bit cycle is longer than the wakeup stable time, the control circuit directs the receiving circuit to start capturing the UART data from the start bit after the wakeup stable time terminates.

According to an embodiment of the invention, step S320 may further comprise: when the start-bit cycle is not longer than the wakeup stable time, the control circuit directs the receiving circuit to start capturing the UART data from the first data bit of the UART data after the wakeup stable time terminates.

According to an embodiment of the invention, the UART data capturing method further comprises the following steps. The control circuit may determine whether the electronic device is woken up by the UART data according to a set value corresponding to the wakeup state. If the electronic device is woken up by the UART data, step S320 is performed. If the electronic device is not woken up by the UART data, the control circuit directs the receiving circuit to capture the UART data based on a normal mode.

According to the UART data capturing method provided in the invention, when the electronic device is woken up by the UART data, the control circuit may compare the start-bit cycle with the wakeup stable time to direct the receiving circuit to start capturing data from the start bit or the first data bit of the UART data. Therefore, the baud-rate which the electronic device can support will be increased.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A Universal Asynchronous Receiver/Transmitter (UART) interface configured in an electronic device, comprising:
   a baud-rate generating circuit, generating a baud rate and a start-bit cycle, wherein the start-bit cycle means a time of transmitting a start bit;
   a control circuit, coupled to the baud-rate generating circuit, wherein the control circuit obtains a wakeup stable time from a wakeup time circuit of the electronic device and obtains the start-bit cycle from the baud-rate generating circuit, wherein when the electronic device is woken up by UART data, the electronic device waits the wakeup stable time before capturing the UART data to make a system of the electronic device be stable; and
   a receiving circuit coupled to the control circuit and capturing data from a start bit or a first data bit of UART data;
   wherein when the electronic device is woken up by the UART data, the control circuit compares the start-bit cycle with the wakeup stable time to direct the receiving circuit to start capturing the data from the start bit or the first data bit of the UART data.

2. The UART interface circuit of claim 1, wherein when the start-bit cycle is longer than the wakeup stable time, the control circuit directs the receiving circuit to start capturing the UART data from the start bit after the wakeup stable time terminates.

3. The UART interface circuit of claim 1, wherein when the start-bit cycle is not longer than the wakeup stable time, the control circuit directs the receiving circuit to start capturing the UART data from the first data bit after the wakeup stable time terminates.

4. The UART interface circuit of claim 3, wherein the control circuit determines the level of the first data bit according to the data in the $((2*M-N)/2)$-th system clock cycle of the first data bit, the data in the $((2*M-N)/2-1)$-th system clock cycle of the first data bit, and the data in the $((2*M-N)/2+1)$-th system clock cycle of the first data bit, wherein M is the start-bit cycle and N is the wakeup stable time.

5. The UART interface circuit of claim 1, wherein the control circuit determines whether the electronic device is awakened by the UART data based on a set value corresponding to a wakeup state.

6. A Universal Asynchronous Receiver/Transmitter (UART) data capturing method, applied to an UART interface circuit configured in an electronic device, comprising:
   obtaining, by a control circuit of the UART interface circuit, a wakeup stable time from a wakeup time circuit of the electronic device and obtaining, by the control circuit, a start-bit cycle from a baud-rate generating circuit of the UART interface circuit, wherein the start-bit cycle means a time of transmitting a start bit, and wherein when the electronic device is woken up by UART data, the electronic device waits the wakeup stable time before capturing the UART data to make a system of the electronic device be stable; and
   when the electronic device is woken up by the UART data, comparing, by the control circuit, the start-bit cycle with the wakeup stable time to direct a receiving circuit of the UART interface circuit to start capturing the data from a start bit or a first data bit of the UART data.

7. The UART data capturing method of claim 6, further comprising:
when the start-bit cycle is longer than the wakeup stable time, directing, by the control circuit, the receiving circuit to start capturing the UART data from the start bit after the wakeup stable time terminates.

8. The UART data capturing method of claim 6, further comprising:
when the start-bit cycle is not longer than the wakeup stable time, directing, by the control circuit, the receiving circuit to start capturing the UART data from the first data bit after the wakeup stable time terminates.

9. The UART data capturing method of claim 8, further comprising:
determining, by the control circuit, the level of the first data bit according to the data in the $((2*M-N)/2)$-th system clock cycle of the first data bit, the data in the $((2*M-N)/2-1)$-th system clock cycle of the first data bit, and the data in the $((2*M-N)/2+1)$-th system clock cycle of the first data bit, wherein M is the start-bit cycle and N is the wakeup stable time.

10. The UART interface method of claim 6, further comprising:
determining, by the control circuit, whether the electronic device is awakened by the UART data based on a set value corresponding to a wakeup state.

* * * * *